(12) United States Patent
Becker-Roβ et al.

(10) Patent No.: US 7,804,593 B2
(45) Date of Patent: Sep. 28, 2010

(54) ECHELLE SPECTOMETER WITH IMPROVED USE OF THE DETECTOR BY MEANS OF TWO SPECTROMETER ARRANGEMENTS

(75) Inventors: Helmut Becker-Roβ, Berlin (DE); Stefan Florek, Berlin (DE); Günter Wesemann, Berlin (DE); Michael Okruss, Potsdam (DE)

(73) Assignee: Leibniz-Institut fur Analytische Wissenschaften - ISAS - e.V., Dortmund (DE)

( * ) Notice: Subject to any disclaimer, the term of this patent is extended or adjusted under 35 U.S.C. 154(b) by 645 days.

(21) Appl. No.: 11/629,143

(22) PCT Filed: Jun. 2, 2005

(86) PCT No.: PCT/EP2005/052517

§ 371 (c)(1),
(2), (4) Date: Oct. 15, 2007

(87) PCT Pub. No.: WO2005/121723

PCT Pub. Date: Dec. 22, 2005

(65) Prior Publication Data

US 2008/0094626 A1    Apr. 24, 2008

(30) Foreign Application Priority Data

Jun. 9, 2004    (DE) ...................... 10 2004 028 001

(51) Int. Cl.
*G01J 3/28* (2006.01)
(52) U.S. Cl. .................................................. 356/328
(58) Field of Classification Search ................ 356/302, 356/328
See application file for complete search history.

(56) References Cited

U.S. PATENT DOCUMENTS 4,060,327 A    11/1977    Jacobowitz et al.
5,757,483 A *  5/1998    Pierce, III .................... 356/305
5,973,780 A    10/1999    Tsuboi et al.

FOREIGN PATENT DOCUMENTS

DE    19635046 A1    3/1998

OTHER PUBLICATIONS

N. Kappelmann et al., The High Resolution Spectrograph for Specrum UV, Experimental Astronomy 7,1997, 361-367, 4th Meeting of the European AStronomical Society held jointly with 29th Meeting of the Italian Astronomicasl Society on Progress in European Astrophysics, New Instrucment and Technologies Sep. 25-29, 1995.
LTB Lasertechnik Berlin, buttlerfly with eagle eye, Pressemitteilung, Jan. 25, 2005.

* cited by examiner

*Primary Examiner*—Kara E Geisel
(74) *Attorney, Agent, or Firm*—Thorpe North & Western LLP

(57) ABSTRACT

The invention relates to a spectrometer arrangement (10) comprising a spectrometer (14) for producing a spectrum of a first wavelength range of radiation from a radiation source on a detector (42). Said arrangement also comprises: an Echelle grating (36) for the spectral decomposition of the radiation penetrating the spectrometer arrangement (10) in a main dispersion direction (46); a dispersing element (34) for separating the degrees by means of spectral decomposition of the radiation in a transversal dispersion direction (48) which forms an angle with the main dispersion direction of the Echelle grating (36), in such a way that a two-dimensional spectrum (50) can be produced with a plurality of separated degrees (52); an imaging optical element (24, 38) for imaging the radiation penetrating through an inlet gap (20) into the spectrometer arrangement (10), in an image plane (40); and a surface detector (42) comprising a two dimensional arrangement of a plurality of detector elements in the image plane (40). The inventive arrangement is characterized in that another spectrometer (12) comprising at least one other dispersing element (64) and another imaging optical element (60,66) is provided in order to produce a spectrum (68) of a second wavelength range of radiation, which is different from the first wavelength range, from a radiation source on the same detector (42). The spectra can be spatially or temporally separated on the detector.

13 Claims, 6 Drawing Sheets

ECHELLE SPECTOMETER WITH IMPROVED USE OF THE DETECTOR BY MEANS OF TWO SPECTROMETER ARRANGEMENTS

TECHNICAL FIELD

The invention relates to a spectrometer assembly with a spectrometer for generating a radiation spectrum in a first wavelength range of a light source on a detector comprising:

(a) an Echelle grating for spectrally dispersing radiation entering the spectrometer assembly in a main dispersion direction;

(b) a dispersion element for separating the orders by means of spectrally dispersing the radiation in a lateral dispersion direction forming an angle with the main dispersion direction of the Echelle grating adapted to generate a two dimensional spectrum with a plurality of separated orders;

(c) an imaging optical system for imaging the radiation entering through an entrance slit into the spectrometer assembly in an imaging plane and (d) a detector array with a two-dimensional arrangement of a plurality of detector elements in the imaging plane.

Gratings with a stair-like cross section (Echelle (french)= stairs) are used in such Echelle spectrometers. A diffraction pattern is generated with such stair-like structure with a corresponding Blaze angle, the diffraction pattern concentrating the diffracted Intensity in a high order, for example in fiftieth to one hundredth order. Thereby high spectral resolutions can be achieved with a small assembly. The orders may overlap depending on the incident wavelengths. Therefore, the orders are again dispersed laterally to the dispersion plane in order to separate the various occurring orders. In such a way a two dimensional spectrum is obtained which may be detected with a detector array.

Such an Echelle spectrometer with internal separation of the orders differs from Echelle spectrometers with external separation of the orders, where only radiation from a small spectral range enters the spectrometer. In spectrometers with internal separation of the orders the spectrum is generated in the form of a two dimensional structure on the detector. This structure essentially consists of parallel arranged spectral sections with the size corresponding to a free spectral range. The use of a detector array with many detector elements enables the simultaneous detection of a large wavelength range with a high resolution.

The lateral dispersion usually is selected large enough to fully separate the orders at all positions. In order to guarantee this over the entire spectral range there are spectral ranges where a space is generated between the individual orders which is not used. If a prism is used for the lateral dispersion larger spaces are generated in the spectral range of short wavelengths due to the higher diffraction index than in the spectral range of larger wavelengths.

It is disadvantageous in the known assemblies that the detectors usually must be very large if large spectral ranges shall be detected with high resolution and a sufficient light throughput. Furthermore, there are problems, if the light source emits different spectral intensities. The spectral range between 193 nm and 852 nm, for example, which is very important in spectroscopy is completely covered by some sources, however, the intensity in the range above 350 nm is often larger by several orders of magnitude than the short wavelength spectral range at 200 nm. The detectors normally do not have a sufficient dynamic range so that the spectral ranges can be simultaneously detected only with losses of sensitivity or must be measured with different exposure times.

PRIOR ART

An assembly is known, where the gaps between the orders are used. The spectrometer is provided with an assembly for pre-dispersion of the radiation entering the spectrometer. The radiation is pre-dispersed with a prism having a very small angle. Furthermore, an entrance slit height is chosen which corresponds to the maximum width of a space between two orders in the short wavelength spectral range. With a suitable illumination of the entrance slit the short wavelength radiation can fully enter the spectrometer. The radiation of the larger wavelength spectral region only partially meets the entrance slit due to the pre-dispersion. Thereby a smaller entrance slit height is effective for such ranges where the separation of the orders is not so large. In such a way the light throughput is increased for the spectral range of short wavelengths with generally weaker intensity.

In this assembly the detector surface is fully used, the size of the detector, however, remains the same. The strength of the illumination for each individual detector element is practically not changed either by this assembly. On the other hand, there are overall losses at the additional optical components.

Another assembly is known, aiming at an improved use of the capacity of the detector by a more uniform lateral dispersion over the entire spectral range. This more uniform lateral dispersion is achieved by two oppositely directed prisms having a different material. The dispersion is determined by the difference of the dispersions of the two materials. Large prism angles must be used to achieve a sufficiently large difference. There are correspondingly high transmission losses with simultaneous smaller resulting dispersion.

Furthermore an assembly is known, where a combination of a prism and a grating is used for the generation of the lateral dispersion. The prism has a higher dispersion in the short wavelength spectral range which is the case for the grating in the longer wavelength spectral range. The combination generates a more uniform lateral dispersion than one single component. However, it is a disadvantage that the unambiguousness of the separation of the orders is lost due to the different orders of the lateral dispersing grating. There are also difficulties with the dynamic range of the detector if simultaneous measurements are taken over a large range.

DISCLOSURE OF THE INVENTION

It is an object of the invention to provide a spectrometer assembly of the above mentioned kind where the available detector area can be used in a better way and where the required detector area can be reduced at the same time. Furthermore, it is an object of the invention to provide a spectrometer with an improved dynamic range. According to the invention, this object is achieved in that a further spectrometer is provided having a further dispersion element and a further imaging optical system for the generation of a spectrum of a second wavelength range which is different to the first wavelength range of the radiation from a light source on the same detector.

By using additional optical components in a separate light path the spectrum can be divided into two spectral ranges. The optical components, i.e. dispersion elements, mirrors, entrance slit width etc. can be individually adapted to the measurement task. In such a way a small throughput of light for wavelength ranges with high intensity can be chosen and a high throughput of light for wavelength ranges with low intensity can be chosen. Thereby the radiation on the detector can be better adapted to its dynamic range. Intensive lines can be measured simultaneously with weak lines. Furthermore, the two spectra generated by the different spectrometer assemblies in the common imaging plane can be detected by the same detector area so that the overall outer diameters of the detector will be smaller. Less detector elements must be read out thereby reducing the read-out intervals. No moveable parts, such as rotating mirrors or choppers, are used inside the spectrometers. This facilitates the production and adjustment. Furthermore, no optical parts are required, such as semi-transparent mirrors, light path dividers or the like, reducing the throughput of light, apart from a component for primary division of the light.

It is a particular advantage of the present spectrometer assembly that both spectra are precisely imaged on the detector. Chromatic or other imaging errors are minimized. This is important especially for two-dimensional, continuous spectra as they define the plane for positioning the detector.

Preferably the further dispersion element is also an Echelle grating. A dispersion element can be attributed to the second Echelle grating which is used for the spectral dispersion of the radiation dispersed by the second Echelle grating in a lateral dispersion direction for separating the orders, the direction forming an angle with the dispersion direction of the second Echelle grating. This means that the entire assembly comprises two independent Echelle spectrometers using the same detector. In each of the spectrometers a two dimensional Echelle-spectrum is generated having a different spectral range. Each of the spectrometers can be adapted to this spectral range. The throughput of light, for example, of each of the spectrometers can be adapted to the dynamic range of the detector. The reflectivity and transmission of the optical components can be optimized with respect to the respective spectral range. In a modification of the invention a prism is provided as a dispersion element for separating the respective orders.

In a particularly preferred embodiment of the invention the further spectrometer assembly is symmetrically positioned to the first spectrometer assembly and the detector is positioned on the plane of symmetry and perpendicular thereto. In such an assembly, the detector is not positioned perpendicular on the connection line between the detector and the camera mirror. This can be realized, for example, by an assembly known as a tetraeder assembly where the dispersion direction of the Echelle grating runs perpendicular to the deflection angle at the imaging optical system. The imaging optical system is each formed by a collimator- and a camera mirror. In this assembly the centers of the collimator- and the camera mirror are arranged within the dispersion plane of the Echelle grating.

In a modification of the invention, a mirror is provided for folding the light path between the entrance slit and the collimator and means for influencing the curvature of the mirror adapted to compensate imaging errors, such as astigmatism. The means for influencing the curvature of the mirror can be formed by a mirror frame or at least one longitudinal pressure means extending along a mirror height and pressurizing the mirror from behind at essentially its middle in such a way that a pressure dependent mirror curvature is formed. The pressure means can be exposed to the forces of an adjustable screw. In such an embodiment the imaging errors can be corrected in a particularly simple way.

In a first embodiment of the invention the lateral dispersion is designed such that dark spaces are present between the orders of the two-dimensional spectrum of the first spectrometer on the detector adapted to at least partially receive the spectrum of the second spectrometer imaged thereon. Then the spectra generated at the detector are spatially superimposed and read out simultaneously.

In an alternative embodiment, means are provided for controlling the times for illuminating the detector in such a way that alternating the first or the second wavelength range is imaged onto the detector. In this embodiment the generated spectra are read out at different times. The exposure times can be adapted to the dynamic range of the detector for each individual spectrum. Both embodiments can be combined. The settings of the exposure times can be effected by opening and closing the respective entrance slits. A common chopper can also be provided outside the spectrometer assembly for this purpose.

Further modifications of the invention are subject matter of the subclaims. An embodiment is described below in greater detail with reference to the accompanying drawings.

DESCRIPTION OF THE EMBODIMENT

Figure 1:
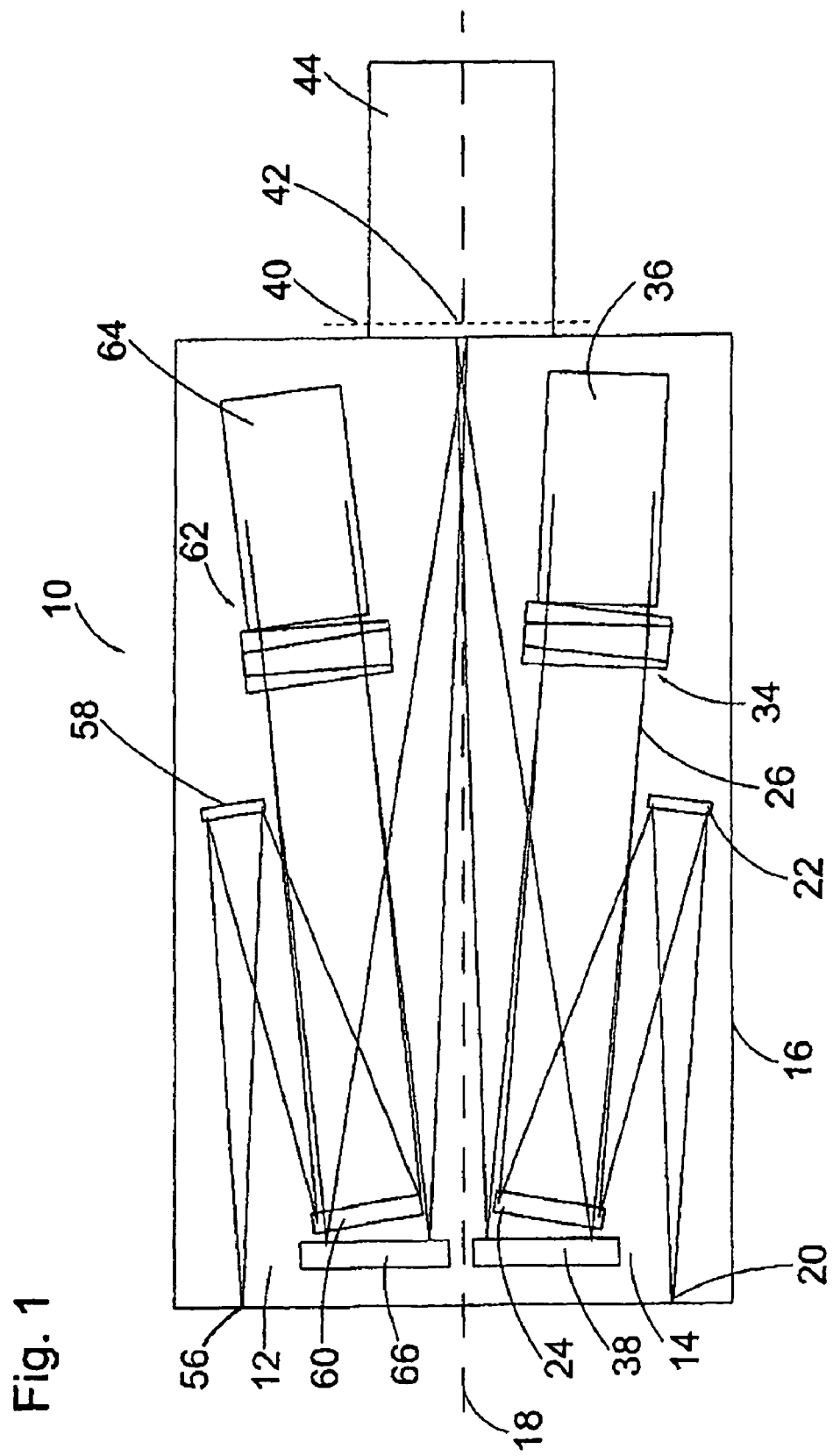
FIG. 1 is a schematic view of a spectrometer assembly with two mirror inverted Echelle spectrometers.

Numeral 10 generally designates a spectrometer assembly in FIG. 1. The spectrometer assembly 10 comprises two spectrometers 12 and 14 disposed in a common housing 16. The components of the spectrometer 12 and 14 are mirror-inverted with respect to the plane 18. For simplicity only one of the spectrometers is, therefore, described in detail.

Radiation enters the spectrometer through an entrance slit 20. The incident radiation meets the plane mirror 22. The radiation is reflected at the plane mirror 22 in the direction of the collimator mirror 24. The collimator mirror 24 is a spherical mirror used for parallelizing divergent radiation. The parallel bundle 26 runs through a prism 34. An Echelle grating 36 is arranged behind the prism.

The dispersion direction of the Echelle grating 36 extends in a plane perpendicular to the illustration plane in FIG. 1. The grooves of the Echelle grating lay in the illustration plane essentially from top to bottom in FIG. 1. The Echelle grating has a very large Blaze angle and the radiation forms a very flat angle on the grating which is mounted with an angle in the illustration plane. The parallel, dispersed radiation is reflected from the grating 36 towards the camera mirror 38. The radiation again passes through the prism 34. The radiation is focused in the imaging plane 40 by the camera mirror 38. A detector array 42 is placed in the plane 40. The detector array 42 consists of an array with a plurality of detector elements. Such a detector array is, for example, a CCD-detector. Further components normally used together with a detector, such as amplifier, converter, electronic equipment and data processing means are schematically shown at 44.

The Echelle-grating 36 disperses the radiation perpendicular to the illustration plane. Due to the large Blaze angle and the large distance of the grooves of the grating compared to the wavelength the radiation is concentrated in a plurality of orders with high order number. Thereby a particularly high resolution is achieved with a comparably small assembly. The prism 34 disperses the radiation in the illustration plane perpendicular to the dispersion direction of the Echelle grating 36 (main dispersion direction). Thereby the orders are separated. A two dimensional spectrum is generated on the detector.

Figure 2:
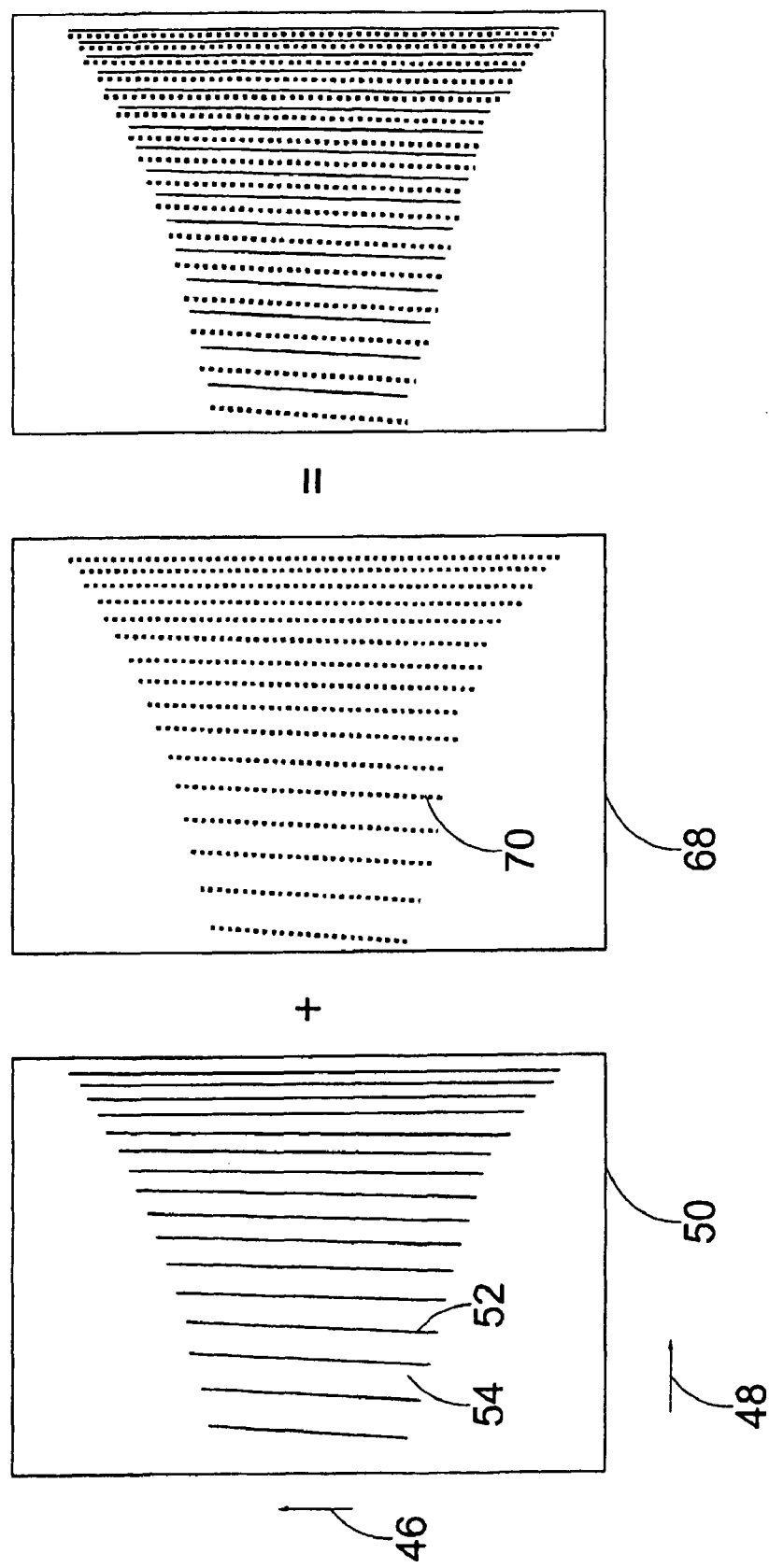
FIG. 2 illustrates how two spectra are spatially superimposed on a detector.

FIG. 2 shows such a spectrum of a light source with a continuous wavelength spectrum. Numeral 50 denotes the end of the spectrum on the detector 42 which is shown here as a top view. The main dispersion direction extends in the direction of arrow 46. The lateral dispersion direction of the prism assembly extends in the direction of arrow 48. Accordingly, the short wavelengths of the ultraviolet spectral range is on the left-hand side in FIG. 2 and the longer wavelengths of the near infrared are on the right hand side. Each vertical line 52 represents a free spectral range of one order. According to the grating dispersion the dispersion is larger at smaller wavelengths and the free spectral range is smaller. The orders are separated in the direction of the arrow 48 by the lateral dispersion. According to the prism dispersion the spaces 54 are larger in the short wavelength range than in the long wavelength range.

In FIG. 1 also the second spectrometer 12 is shown with a second slit 56. It is designed in the same way as the first spectrometer 14. The radiation runs to the plane mirror 58, collimator mirror 60, through the prism 62 over the grating 64 to the camera mirror 66 and is focused also on the detector 42. The grating is also an Echelle grating. However, it is also possible to use a normal diffraction grating instead of an Echelle grating and to image only one order, for example as a reference with large scanning range, on the detector.

The spectrometer 12 also generates a two dimensional image on the detector 42. This is separately shown in FIG. 2 by dotted lines 70 and designated with numeral 68. If both entrance slits 56 and 20 are illuminated it is possible to combine both spectra and to simultaneously image them on the detector 42. Step motors (not shown) are provided at the camera mirrors 38 and/or 66 and at the Echelle gratings 36 and/or 64 to move the image in the detector plane. The spectra may be combined in such a way, that the orders 70 of one spectrum lay in the spaces 54 of the other spectrum. Thereby the detector surface is optimally used. If the radiation of the short wavelength range, for example between 190 nm and 300 nm, is guided through one spectrometer and the radiation in the longer wavelength range, for example 300 nm to 852 nm through the other spectrometer the size of the detector can be kept small without essential changes of the light throughput or spectral resolution. Due to the wavelength dependence of the prism dispersion, a combination of prisms 62 and 34 must be used where the wavelength dependence results in dispersions which provide a suitable pattern of orders.

Figure 3:
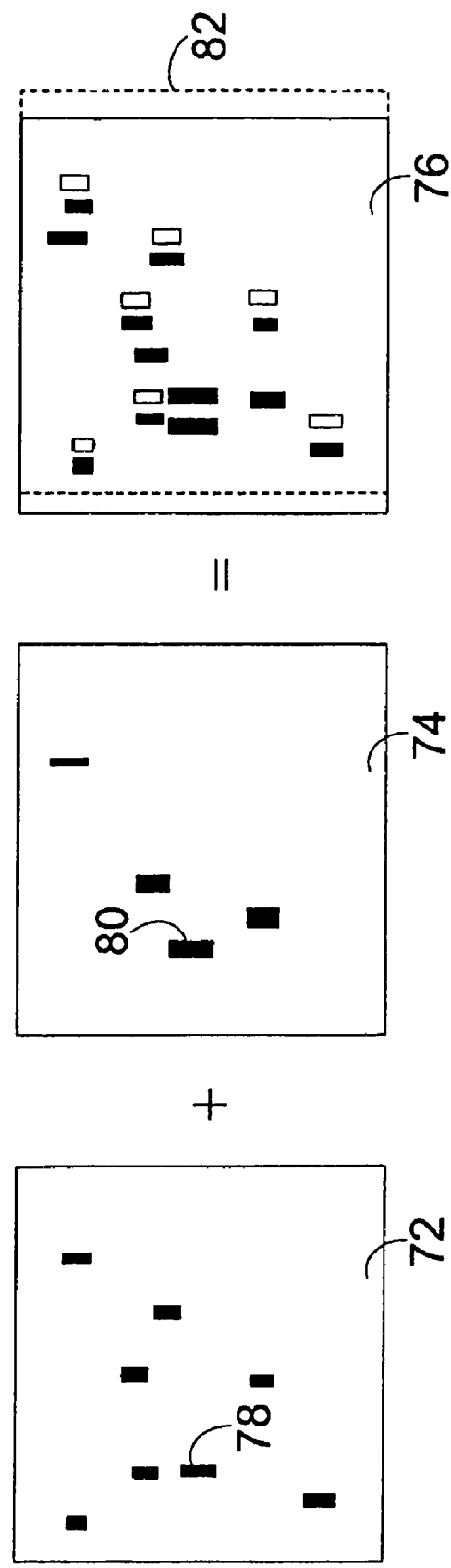
FIG. 3 illustrates how two spatially superimposed line spectra can be adjusted to minimum overlap

Especially with line emitters as a light source or with measuring tasks where only certain, small, clearly defined spectral ranges are relevant, the prism dispersion does not necessarily need to be adapted to the separation of the orders of the respective different spectrum section. This is schematically shown in FIG. 3. Two line spectra 72 and 74 are superimposed on the detector, so that the image 76 is obtained. The lines 78 and 80 would overlap in this image. The spectrum 72 is, therefore, shifted in the plane a little by rotating the camera mirror, until the lines do not overlap anymore. The original position 72 is shown in dotted lines 82. With complex line spectra, an overlap cannot be fully avoided. In that case, the images of the spectra are shifted step by step against each other by, for example, a Greek key pattern, and the degree of overlap is determined. The optimum position of the images is defined by the minimum degree of overlap.

Figure 4:
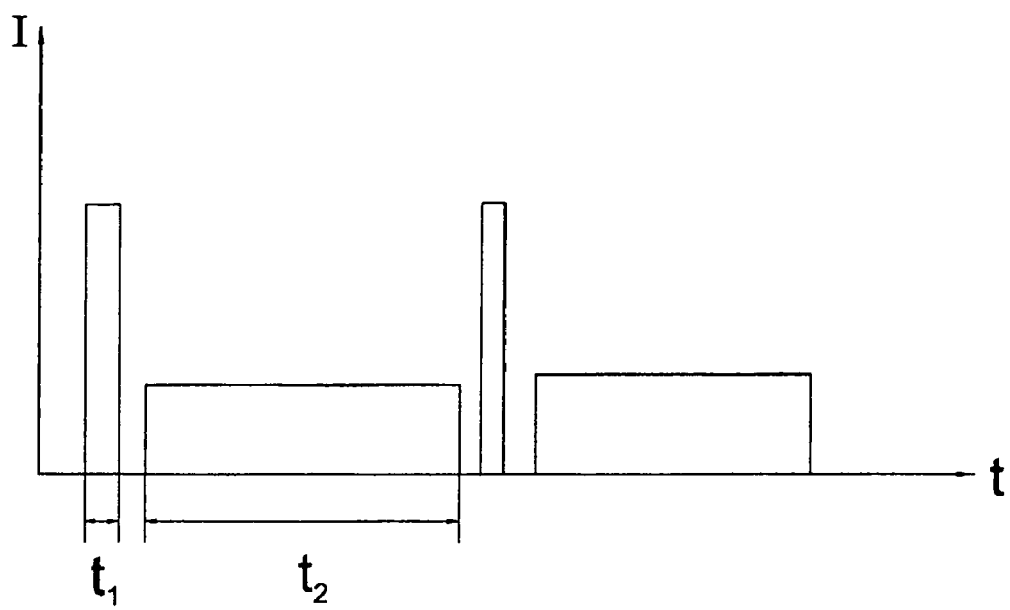
FIG. 4 shows the time-dependent intensity graph of a detector element where the detector is exposed to the illumination of two spectra and read out alternating in different intervals.

In an alternative embodiment to the embodiment with overlapping areas of the spectra, the spectra are shifted in time on the detector. FIG. 4 schematically shows the intensity graph of a pixel. Depending on the detector, the spectrum which has weak intensities is read out only after a longer interval $t_2$ than the more intensive spectrum which has already been read out after a short interval $t_1$.

Figure 5:
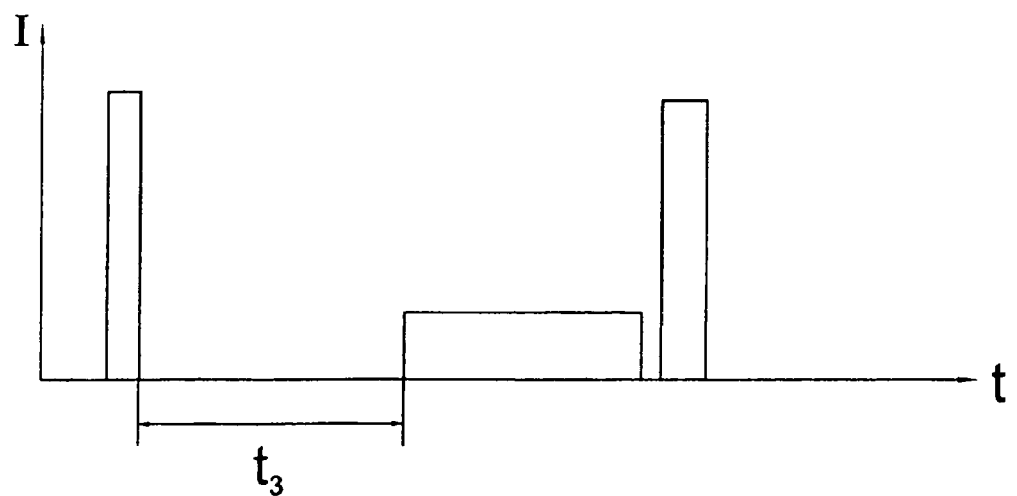
FIG. 5 shows the time-dependent intensity graph of a detector element where the detector is exposed to the illumination of two spectra with the same intervals and read out alternating in different intervals.
Figure 6:
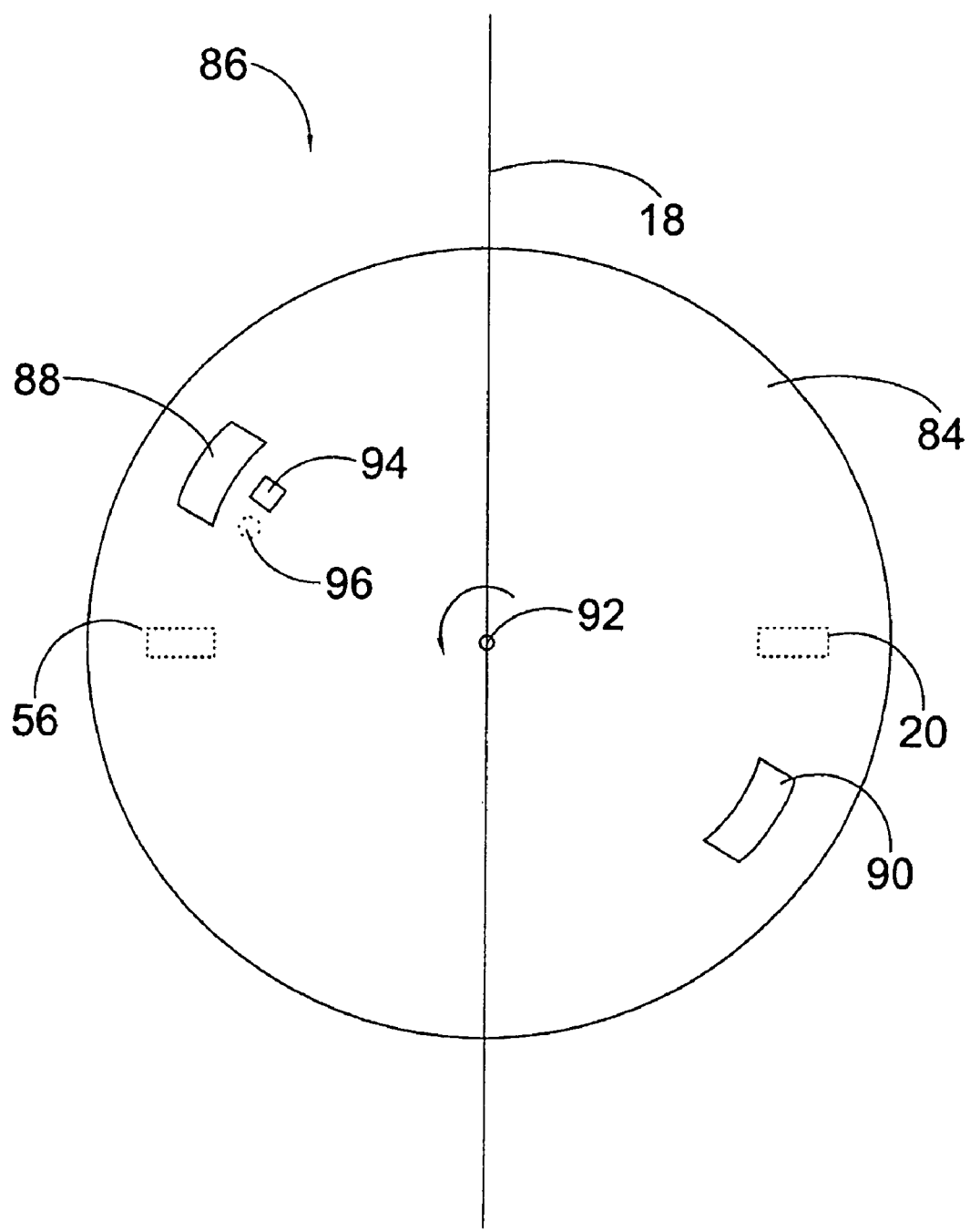
FIG. 6 is a top view on a chopper disc for illuminating the entrance slit in intervals.
Figure 7:
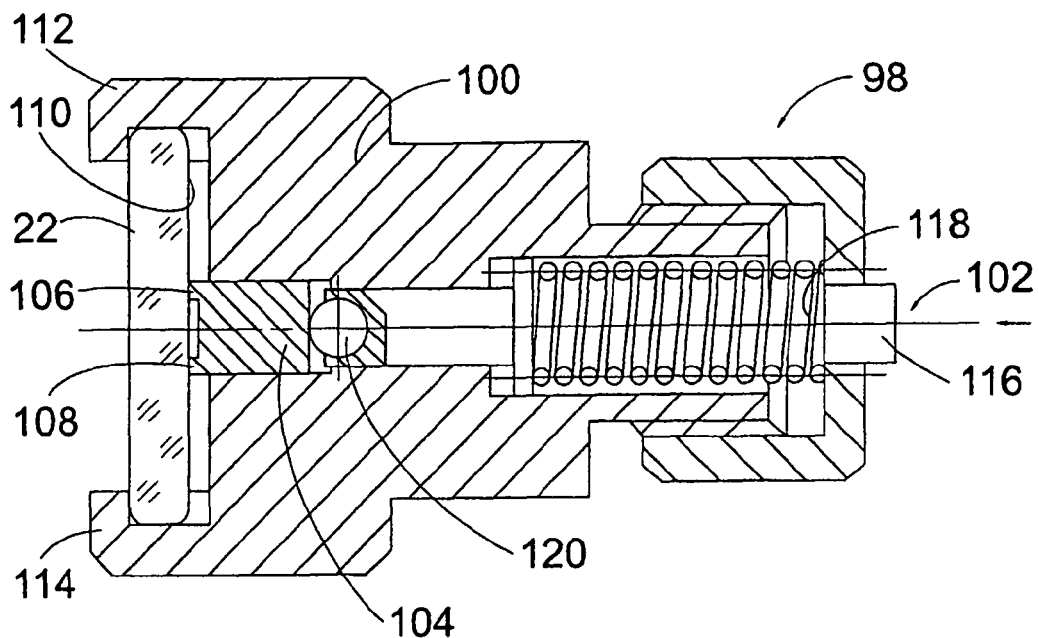
FIG. 7 is a detailed view of a cylindric mirror in an uncurved position.
Figure 8:
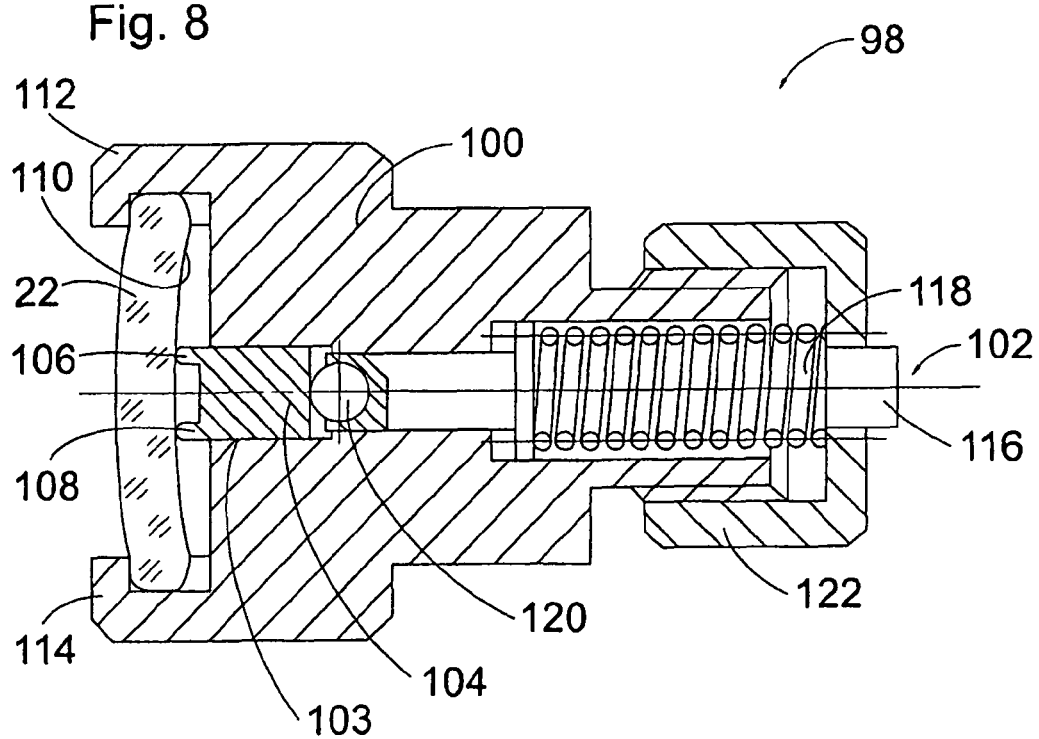
FIG. 8 shows the cylindric mirror of FIG. 7 in a curved position.

Alternatively the intensive spectrum is shut off by a chopper so that the detector is illuminated for a shorter time than the spectrum with weak intensities. This is shown in FIG. 5. During the interval $t_3$ no light enters through the slit.

There are applications, for example LIPS, where particularly quick switching times are necessary. In such an application the sample is scanned with a laser beam. The laser beam releases a small portion of the substance on the surface and exites it. During the first microseconds after the collision with the laser pulse the substance emits a continuous spectrum. This radiation shall not be detected. Only after this period element-specific atomic emission shall be detected. A rotating chopper 86 is used in the present embodiment to realize these particularly short switching times. The chopper 86 is disposed immediately before one and/or both entrance slits 20 and 56 in FIG. 1. The chopper comprises a disc 84 with a diameter of about 10 cm. The diameter is larger than the distance between the entrance slits 20 and 56. Two slits 88 and 90 with a width of less than 10 mm are provided in the disc 84. The disc 84 is mounted on the shaft of a high-speed motor. The shaft is aligned with the chopper axis denoted with numeral 92 and lies in the mirror plane 18 of FIG. 1. The motor operates in the orders of 30 000 rotations/min. In order to avoid air friction and oscillations, the disc is mounted in a housing with a window for the radiation. A water-cooling system is provided at the housing to dispose of the heat. Switching times in the order of 1 µs with detection times of about 20 µs can be realized.

The invention claimed is:
1. A spectrometer assembly comprising:
a light source emitting radiation, the radiation having a wavelength spectrum in a first and second wavelength range;
a housing with an entrance slit;
an Echelle grating for spectrally dispersing said radiation entering through said entrance slit in a main dispersion direction into a plurality of orders;
a dispersion element for separating said orders by means of spectrally dispersing said radiation in a lateral dispersion direction, said lateral dispersion direction forming an angle with said main dispersion direction of said Echelle grating and thereby generating a two dimensional spectrum with said plurality of orders being separated from each other;
an imaging optical system for imaging said two dimensional spectrum onto an imaging plane;
a detector array with a two-dimensional arrangement of a plurality of detector elements in said imaging plane, wherein said Echelle grating, dispersion element and imaging optical system forming a first spectrometer for generating said radiation spectrum in said first wavelength range of said light source on said detector;

a further spectrometer providing a further dispersion element and a further imaging optical system for the generation of a radiation spectrum in said second wavelength range which is different from said first wavelength range said detector.

2. A spectrometer assembly according to claim 1, wherein said further dispersion element is also an Echelle grating with a dispersion direction and a dispersion element attributed to said further Echelle grating which is used for spectral dispersion of said radiation dispersed by said further Echelle grating in a lateral dispersion direction for separating said orders, said lateral direction forming an angle with said dispersion direction of said further Echelle grating.

3. A spectrometer assembly according to claim 1, wherein said dispersion element for separating said orders is a prism.

4. A spectrometer assembly according to claim 1, wherein said further spectrometer is symmetrically positioned to said first spectrometer, thereby defining a plane of symmetry therebetween and said detector is positioned on said plane of symmetry and perpendicular thereto.

5. A spectrometer assembly according to claim 1, wherein each of said imaging optical systems is formed by a collimator and a camera.

6. A spectrometer assembly according to claim 5, wherein a mirror is provided for folding the light path between said entrance slit and said collimator, said mirror having a curvature and a height and wherein said collimator and a means for influencing said curvature of said mirror are adapted to compensate for imaging errors.

7. A spectrometer assembly according to claim 6, wherein said means for influencing said curvature of said mirror are formed by a carrier and at least one longitudinal pressure means extending along said mirror height and pressurizing said mirror from behind at essentially its middle with a pressure in such a way that a pressure dependent mirror curvature is formed.

8. A spectrometer assembly according to claim 7, wherein an adjustable screw is provided, said screw generating forces, and wherein said pressure means is exposed to said forces.

9. A spectrometer assembly according to claim 1, wherein said spectra of said first and second wavelength ranges spatially at least partially superimpose on said detector.

10. A spectrometer assembly according to claim 1, wherein the detector is illuminated with time intervals and means are provided for controlling said time intervals in such a way that alternating said first or said second wavelength range is imaged onto said detector.

11. A method for adjusting a spectrometer assembly according to claim 1, comprising the steps of:
providing a first and a second line emitter, each emitting radiation with a line spectrum having lines;
illuminating said entrance slit of said first spectrometer with said radiation of said first line emitter;

illuminating said entrance slit of said second spectrometer with said radiation of said second line emitter, simultaneously detecting said line spectra generated by said first and second spectrometers with said detector; and spatially shifting said line spectra against each other by means of one or both of said imaging optical systems in such a way that the superposition of all or selected lines is a minimum.

12. A method for using a spectrometer assembly according to claim 1 for Laser induced plasma spectroscopy (LIPS), comprising the steps of:
covering at least one of said entrance slits of said first and second spectrometers;
illuminating a sample substance with a laser beam to create said light source emitting radiation; and
uncovering said at least one entrance slit after a predetermined interval of time to allow an element-specific atomic emission from said illuminated sample substance to enter at least one of said first and second spectrometers.

13. A spectrometer assembly comprising:
a light source emitting radiation, the radiation having a wavelength spectrum in a first and second wavelength range;
a housing with an entrance slit;
an Echelle grating for spectrally dispersing said radiation entering through said entrance slit in a main dispersion direction into a plurality of orders;
a dispersion element for separating said orders by means of spectrally dispersing said radiation in a lateral dispersion direction, said lateral dispersion direction forming an angle with said main dispersion direction of said Echelle grating and thereby generating a two dimensional spectrum with said plurality of orders being separated from each other;
an imaging optical system for imaging said two dimensional spectrum onto an imaging plane;
a detector array with a two-dimensional arrangement of a plurality of detector elements in said imaging plane
wherein said Echelle grating, dispersion element and imaging optical system form a first spectrometer for generating said radiation spectrum in said first wavelength range of said light source on said detector and
a further spectrometer having a further dispersion element and a further imaging optical system for the generation of a radiation spectrum in said second wavelength range which is different from said first wavelength range on said detector;
wherein said spectra of said first and second wavelength ranges spatially at least partially superimpose on said detector, and said lateral dispersion is designed such that dark spaces are present between said orders of said two dimensional spectrum of said first spectrometer on said detector adapted to at least partially receive said spectrum of said second spectrometer imaged thereon.

* * * * *